(12) United States Patent
Okajima et al.

(10) Patent No.: US 7,707,328 B2
(45) Date of Patent: Apr. 27, 2010

(54) MEMORY ACCESS CONTROL CIRCUIT

(75) Inventors: Kazunori Okajima, Osaka (JP);
Yasuyuki Tomida, Osaka (JP);
Kunihiro Kaida, Osaka (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 11/265,276

(22) Filed: Nov. 3, 2005

(65) Prior Publication Data

US 2006/0218315 A1    Sep. 28, 2006

(30) Foreign Application Priority Data

Mar. 25, 2005    (JP)    ............... 2005-090139

(51) Int. Cl.
*G06F 13/00* (2006.01)
*G06F 13/28* (2006.01)

(52) U.S. Cl. ......................... 710/35; 711/105
(58) Field of Classification Search ................. 710/35; 711/105

See application file for complete search history.

(56) References Cited

U.S. PATENT DOCUMENTS

| 6,009,493 | A | 12/1999 | Fujiyama |
| 6,345,334 | B1 | 2/2002 | Nakagawa et al. |
| 6,405,280 | B1 * | 6/2002 | Ryan .......................... 711/105 |
| 2005/0091467 | A1 * | 4/2005 | Robotham ................. 711/201 |
| 2005/0193155 | A1 * | 9/2005 | Fujita ......................... 710/111 |

FOREIGN PATENT DOCUMENTS

| JP | 2000-251470 A | 9/2000 |
| JP | 2004-046371 A | 2/2004 |

OTHER PUBLICATIONS

US 6,438,062, 08/2002, Curtis et al. (withdrawn)*

* cited by examiner

*Primary Examiner*—Henry W. H. Tsai
*Assistant Examiner*—Hyun Nam
(74) *Attorney, Agent, or Firm*—McDermott Will & Emery LLP

(57) ABSTRACT

A data transfer request of a data processing device with respect to a synchronous memory is divided by a burst transfer length unit request dividing section into a plurality of data transfer requests in which a data transfer amount is an amount of data to be burst-transferred at a time and the data to be burst-transferred at a time is within a single memory bank. An assembling section assembles the divided data transfer requests into a plurality of new data transfer requests obtained by combining the divided data transfer requests, one for each memory bank. A data processing device can efficiently access continuous data stored in a plurality of memory banks, and is useful as a memory access control circuit of controlling an access operation of a data processing device with respect to a synchronous memory.

10 Claims, 15 Drawing Sheets

Example of storage of one line of image data

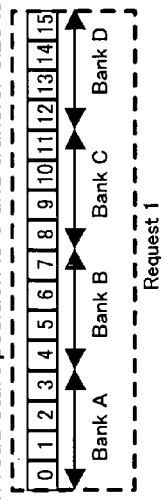

FIG.13A
When read start position is 0 and transfer size is 16 words:
⇒ The number of requests of Banks (A, B, C, D) is one
(when unit of transfer at a time is 4 words, 4 banks)

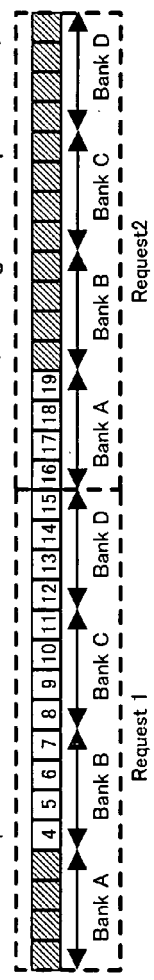

FIG.13B
When read start position is 4 and transfer size is 16 words (rearrangement is performed):
⇒ The number of requests of Banks (A, B, C, D) is two

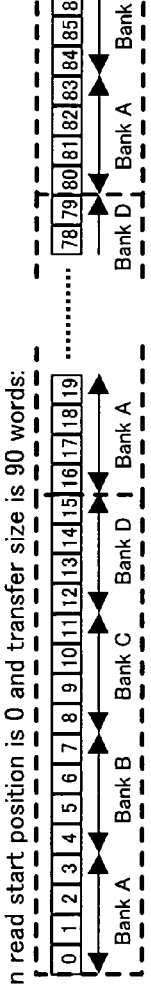

FIG.13C
When read start position is 0 and transfer size is 90 words:
⇒ The number of requests of Banks (A, B, C, D) is six

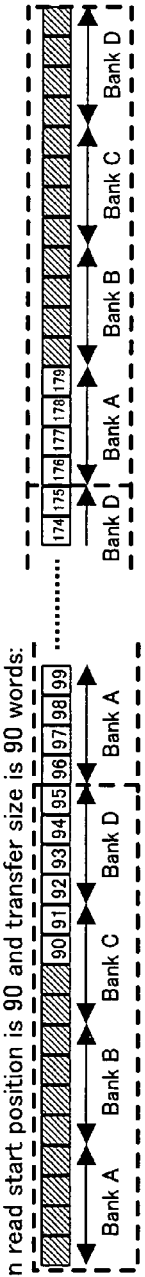

FIG.13D
When read start position is 90 and transfer size is 90 words:
⇒ The number of requests of Banks (A, B, C, D) is seven

MEMORY ACCESS CONTROL CIRCUIT

CROSS REFERENCE TO RELATED APPLICATIONS

This non-provisional application claims priority under 35 U.S.C. §119(a) on Patent Application No. 2005-90139 filed in Japan on Mar. 25, 2005, the entire contents of which are hereby incorporated by reference.

BACKGROUND OF THE INVENTION

1. Field of the Invention

The present invention relates to a memory access control circuit of controlling an access operation of a data processing device with respect to a synchronous memory.

2. Description of the Prior Art

With recent improvements in semiconductor process technology, large-scale system circuits have been widely developed. In some large-scale system circuits, a plurality of data processing devices are provided in a single system. Such large-scale system circuits (data processing system) often adopt a unified memory access system in which the data processing devices use a single memory in common. The unified memory access system is typically provided with a memory access control circuit which arbitrates data transfer requests issued from a plurality of data processing devices to a single memory. A memory access control circuit for use in the unified memory access system has been proposed, which limits a data transfer length to a fixed length, divides each data transfer request from a plurality of data processing devices into fixed-length data transfer requests, and arbitrates the divided requests (see, for example, Japanese Patent Unexamined Publication No. 2004-46371).

The unified memory access system often uses an SDRAM (Synchronous DRAM). The SDRAM comprises a column address counter in which a column address is externally supplied and preset, and can readily perform continuous data access by internally incrementing the counter. Such access is called burst access.

In the SDRAM, when another column address is input during burst access, data located at the same row address and the other column address can be accessed.

Note that, if row addresses are changed during continuous access, an operation time of a row address system (e.g., a time required for precharging, etc.) is required in addition to an operation time of a column address system, so that it takes an extra long time to read out data.

In order to eliminate such an extra access time, the SDRAM comprises a plurality of memory blocks (hereinafter referred to as a memory bank, or simply a bank) which can be independently operated. In general, the SDRAM comprises a plurality of memory banks (e.g., a bank A, a bank B, a bank C, and a bank D). These memory banks are repeatedly accessed in sequence, thereby making it possible to achieve efficient data transfer.

FIG. 11 illustrates access timing with which the banks A to D of the SDRAM are repeatedly accessed in sequence. FIG. 11 illustrates an example in which the banks are switched every four words, CL (column address strobe (CAS) latency: the number of memory cycles from when a column address is determined to when read data is determined) is three cycles.

For example, in the SDRAM which operates with this access timing, initially, an active command (Act) is used to select the bank A and provide a row address 0 (Row 0). Thereafter, a read command (Read) is input to designate a column address 0 (Col 0), thereby reading 4-word data A00 to A03 in sequence from the bank A. Thereafter, an active command designating the bank B, and a read command are input, and 4-word data is read from the bank B. Similarly, sequential access is performed for the banks C and D, so that 4-word data is read out from the banks.

Input of an active command (Act), designation of a row address, and designation of a column address by a read command (Read) with respect to the bank B can be issued at some point during the time when the bank A is accessed. Therefore, at some point during the time when a certain bank is accessed, a command is issued in advance with respect to the next bank to be accessed. By accessing the banks A to D in sequence in this manner, it is possible to eliminate a waste access time, resulting in efficient memory access. Further, in the example of FIG. 11, a precharge command (Pre) is input to the banks A and B so as to access Rows 1 of the banks A and B.

Therefore, in the unified memory access system composed of the SDRAM, when continuous data, such as audio data or image data, is stored in the SDRAM, it is possible to perform efficient data transfer. For example, FIG. 12 illustrates that the bank structure of the SDRAM is used to store continuous data, such as image data. In this example, continuous data corresponding to one line of an image is stored in the banks A to D in units of 4 words. Specifically, data 0 to data 3 are stored in the bank A, data 4 to data 7 are stored in the bank B, data 8 to data 11 are stored in the bank C, and data 12 to data 15 are stored in bank D. Data corresponding to the following one line is similarly stored in the banks A to D in units of 4 words.

The data thus stored is controlled by the memory access control circuit. For example, when a read start position is 0 and a transfer size is 16 words, the banks A to D are each accessed once so that data corresponding to one line of an image is efficiently transferred as illustrated in FIG. 13A.

However, in the above-described memory access control circuit, when data is read from some midpoint of a bank, waste data transfer may occur.

For example, as illustrated in FIG. 13B, when a read start position is 4 and a transfer size is 16 words, the banks A to D are each accessed twice in the system in which 4 banks are continuously accessed. In this case, access to the bank A at the time of the first request and access to the banks B to D at the time of the second request are wasteful, resulting in inefficient transfer.

Also, as illustrated in FIG. 13C, when a read start position is 0 and a transfer size is 90 words, the banks A to D are each accessed six times in the system in which 4 banks are continuously accessed. Also, as illustrated in FIG. 13D, when a read start position is 90 and a transfer size is 90 words, the banks A to D are each accessed seven times. Concerning the data transfer of FIGS. 13C and 13D, the data transfer of FIG. 13D has the number of times of access which is larger by one than that of FIG. 13C, no matter that the transfer size is the same 90 words.

As described above, the transfer efficiency of the above-described memory access control circuit of the unified memory access system varies depending on the read start position.

To address such transfer inefficiency, a memory access control circuit has been proposed, which changes the sequence of data to be read from the SDRAM so that memory access is always started from a predetermined bank and ended in another predetermined bank, thereby eliminating waste access (see, for example, Japanese Patent Unexamined Publication No. 2000-251470).

However, in the case of the memory access control circuit which changes the sequence of data to be read out, for a bank which is accessed from some midpoint thereof, data at another column address is combined in the same bank, depending on the read start position, thereby performing data transfer with burst transfer size. Therefore, a column address needs to be input again at some point during the time when data transfer (burst transfer) is performed. Assuming that column addresses are changed at some point during the time when burst transfer is performed, when access to one bank is ended and the next bank is accessed, an invalid period (a period during which data is not output) occurs, resulting in a decrease in data transfer efficiency.

For example, FIG. 14 illustrates timing with which the SDRAM is accessed in a manner such that, when the banks A to D of the SDRAM are accessed in sequence, only column addresses are changed, but not row addresses, when the bank A is being accessed. In this example, when burst access is being performed with respect to Row 1 and Col 0 of the bank A, only the column address is changed to Col 6 while keeping the same bank and the same row address, and access is performed. In this case, another column address is input during burst access, an active command (Act), a read command (Read), and a write command can no longer be input, so that an invalid period occurs between output data of the bank A and output data of the bank B.

SUMMARY OF THE INVENTION

The present invention has been achieved, paying attention to the above-described problems. An object of the present invention is to provide a memory access control circuit capable of causing a data processing device to efficiently access continuous data stored in a plurality of memory banks.

In order to solve the above-described problems, the present invention provides a memory access control circuit of controlling access of a data processing device to a memory, wherein the memory is a synchronous memory having a plurality of memory banks capable of being operated independently, and data can be burst-transferred in accordance with a clock signal, the memory access control circuit comprising:

a burst transfer length unit transfer request dividing section of receiving a data transfer request with respect to the memory from the data processing device, and dividing the received data transfer request into a plurality of data transfer requests in which a data transfer amount is an amount of data to be burst-transferred at a time, and the data to be burst-transferred at a time is within a single memory bank;

a transfer request assembling section of assembling the plurality of data transfer requests divided by the burst transfer length unit transfer request dividing section into a plurality of new data transfer requests obtained by combining the divided data transfer requests, one for each memory bank;

a data transfer control section of controlling data transfer between the memory and the data processing device based on the new data transfer request.

In one embodiment of this invention, when there is a lack of data transfer requests with respect to any of the memory banks during the combination of data transfer requests, the transfer request assembling section generates necessary data transfer requests to be combined.

In one embodiment of this invention, at least two burst transfer length unit transfer request dividing sections and at least two transfer request assembling sections are provided, the memory access control circuit further comprises an execution order determining section of determining an order of execution of data transfer requests generated by each of the transfer request assembling sections, and the data transfer control section controls data transfer in accordance with the order determined by the execution order determining section.

Thereby, it is possible for a data processing device to efficiently access continuous data stored in a plurality of memory banks.

In addition, an access request with respect to a memory is divided so that each access request does not extend over a plurality of banks, and divided access requests are rearranged so that the memory is accessed from a predetermined memory bank. As a result, an invalid period (a period during which data is not output) can be eliminated.

In one embodiment of this invention, the memory access control circuit further comprises:

a whole memory bank unit transfer request dividing section of receiving a data transfer request with respect to the memory from a data processing device different from a data processing device whose data transfer request is received by the burst transfer length unit transfer request dividing section, and dividing the received data transfer request into a plurality of new data transfer requests in which a data transfer amount is a product of an amount of data to be burst-transferred at a time multiplied by the number of memory banks in the memory; and an execution order determining section of determining an order of execution of the data transfer request generated by the transfer request assembling section and the data transfer request generated by the whole memory bank unit transfer request dividing section, wherein the data transfer control section controls data transfer with the order determined by the execution order determining section.

Thereby, for example, for continuous data stored in a plurality of memory banks, a data processing device which reads data from some midpoint of a bank is connected to a burst transfer length unit transfer request dividing section, while a data processing device which consistently reads data from a predetermined bank is connected to a whole memory bank unit transfer request dividing section. Thus, data transfer is performed with a method suitable for each data processing device.

In one embodiment of this invention, the execution order determining section determines the order of execution such that the data transfer request of the data processing device is continuously executed the number of times indicated by number-of-times information provided by the data processing device.

Thereby, the size of data to be transferred at a time by a data processing device can be controlled. For example, the size of data to be transferred at a time can be increased for a data processing device which requires a large amount of data, thereby making it possible to improve processing rate and data transfer efficiency.

In one embodiment of this invention, the memory access control circuit further comprises:

a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and a selecting section of receiving transfer status information indicating how many data transfer requests for which data transfer has not been ended remain, and outputting the data transfer request generated by the whole memory bank unit transfer request dividing section to the execution order determining section when the number of data transfer requests waiting for data transfer indicated by the transfer status information is smaller than a predetermined number, and outputting the data transfer request generating by the transfer request assembling section to the execution order determining section when the number of data transfer requests waiting for data transfer is larger than the predetermined number, wherein the execution order determining section determines the order of execution of the received data transfer request, and outputs the transfer status information.

In one embodiment of this invention, the memory access control circuit further comprises:

a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and a selecting section of receiving, from the data processing device, transfer request time information indicating within what transfer request time after the data processing device outputs a data transfer request data transfer should be started, and outputting the data transfer request generated by the whole memory bank unit transfer request dividing section to the execution order determining section when a transfer request time indicated by the transfer request time information is shorter than a predetermined time, and outputting the data transfer request generated by the transfer request assembling section to the execution order determining section when the transfer request time is longer than the predetermined time.

In one embodiment of this invention, the memory access control circuit further comprises:

a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and a selecting section of selectively outputting one of the data transfer request generated by the whole memory bank unit transfer request dividing section and the data transfer request generated by the transfer request assembling section, based on selection information output by the data processing device.

Thereby, a method of dividing a data transfer request is selected, depending on the number of access requests waiting for data transfer, transfer request time provided from a data processing device, or control of the data processing device, thereby making it possible to improve processing rate and data transfer efficiency.

BRIEF DESCRIPTION OF THE DRAWINGS

FIG. 13A is a diagram illustrating an example of data transfer in a conventional memory access control circuit where a read start position is 0 and a transfer size is 16 words.

FIG. 13B is a diagram illustrating an example of data transfer in the conventional memory access control circuit where a read start position is 4 and a transfer size is 16 words.

FIG. 13C is a diagram illustrating an example of data transfer in the conventional memory access control circuit where a read start position is 0 and a transfer size is 90 words.

FIG. 13D is a diagram illustrating an example of data transfer in the conventional memory access control circuit where a read start position is 90 and a transfer size is 90 words.

DETAILED DESCRIPTION OF THE PREFERRED EMBODIMENT

Hereinafter, embodiments of the present invention will be described with reference to the accompanying drawings.

Embodiment 1

Structure of Data Processing System

Figure 1:
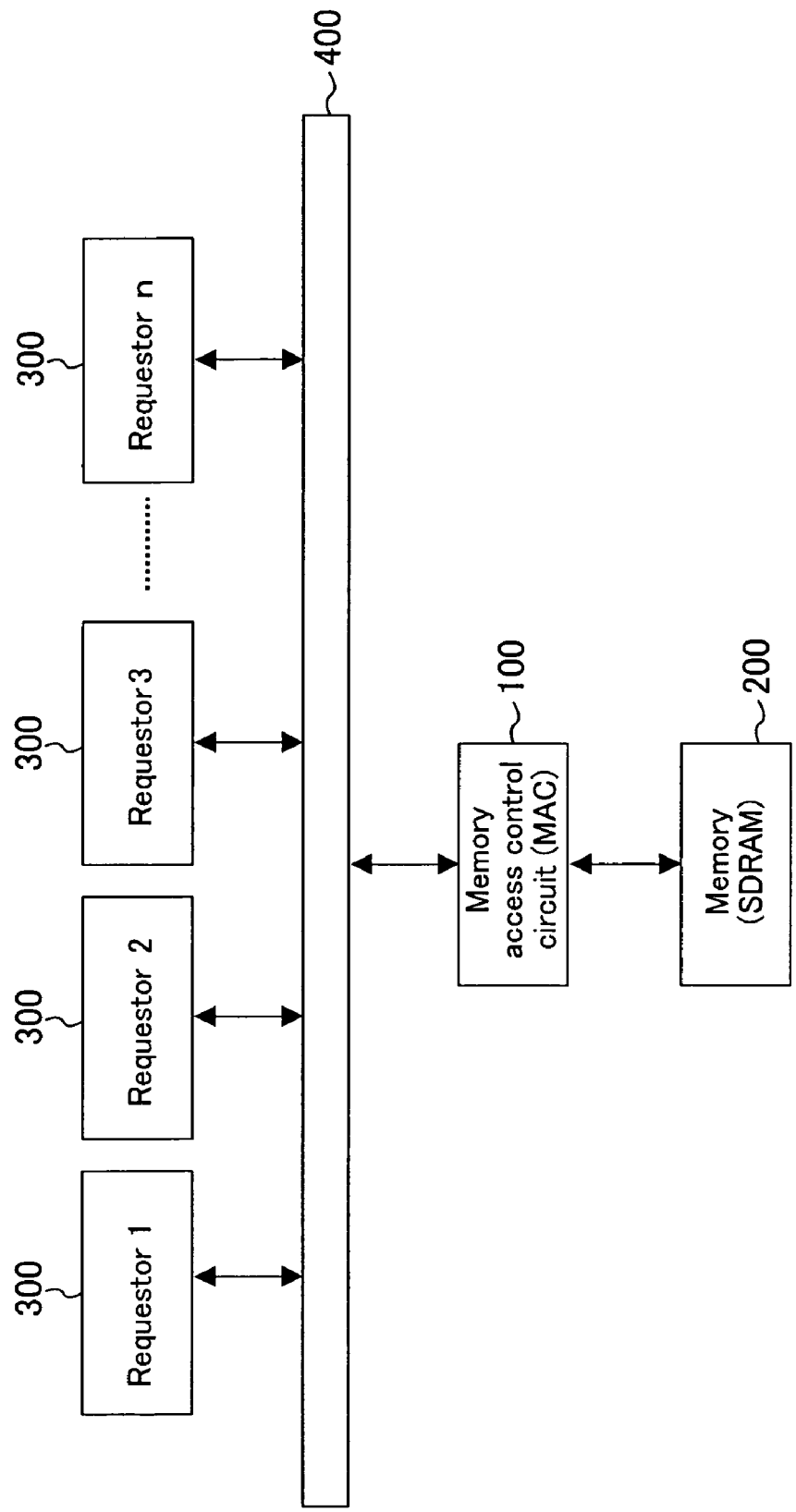
FIG. 1 is a block diagram illustrating a structure of a data processing system comprising a memory access control circuit according to Embodiment 1 of the present invention.

FIG. 1 is a block diagram illustrating a structure of a data processing system comprising a memory access control circuit 100 (MAC) according to Embodiment 1 of the present invention. As illustrated in FIG. 1, the data processing system comprises the memory access control circuit 100, a memory 200, and a plurality of requestors 300 (data processing devices). Each requester 300 is connected via a bus 400 to the memory access control circuit 100. Data which is to be processed by each requestor 300 is stored and accessed in the memory 200. In other words, a storage area of the single memory 200 is used in common by the requestors 300. Thus, the data processing system is a so-called unified memory access system.

The memory access control circuit 100 is hardware which manages access of each requestor 300 to the memory 200 (management of which requestor is permitted to perform input/output of the memory 200), and mapping of the memory 200 (management of which address of the memory 200 is permitted for input/output of data). Specifically, when receiving an access request from one of the requestors 300, the memory access control circuit 100 arbitrates the access request and access request(s) from other requestor(s) 300 to determine timing of executing the access request, and issues an enable signal EN with respect to the corresponding requester 300 with the timing of executing the request.

The memory 200 is a memory device which performs data transfer in synchronization with a predetermined clock signal, and is accessed via the memory access control circuit 100 from each requester 300.

Also, the memory 200 comprises a plurality of memory blocks (hereinafter referred to as memory banks, or simply banks) which can be operated independently. In the following description, it is assumed that the memory 200 comprises four memory banks (a bank A, a bank B, a bank C, and a bank D).

The memory 200 further comprises a column address counter in which a column address is externally supplied and preset. By the memory 200 incrementing the counter, continuous data access (burst access) is performed. When the burst access is performed, a fixed size (burst transfer length) of data is transferred at a time with respect to one memory bank.

An example of the memory 200 is a Synchronous DRAM.

The requestor 300 is, for example, a data processing device, such as a CPU (Central Processing Unit), a DSP (Digital Signal Processor), or the like. When the requestor 300 accesses the memory 200, i.e., data is written to or read from the memory 200, the requestor 300 issues a request to the memory access control circuit 100. Thereafter, during the time when the enable signal EN is issued from the memory access control circuit 100, data is transferred via the memory access control circuit 100 between the requester 300 and the memory 200 (data transfer for data write or data transfer for data read).

Note that the data transfer size for a single request varies depending on the requestor 300. For example, one requestor requests data transfer of 128 words (1 word is data having a length of 32 bits length) with a single request, or another requestor requests data of 32 words with a single request.

The size of data transfer requested by the same requestor 300 may not be fixed.

(Structure of the Memory Access Control Circuit 100)

The structure of the memory access control circuit 100 will be described in greater detail.

Figure 2:
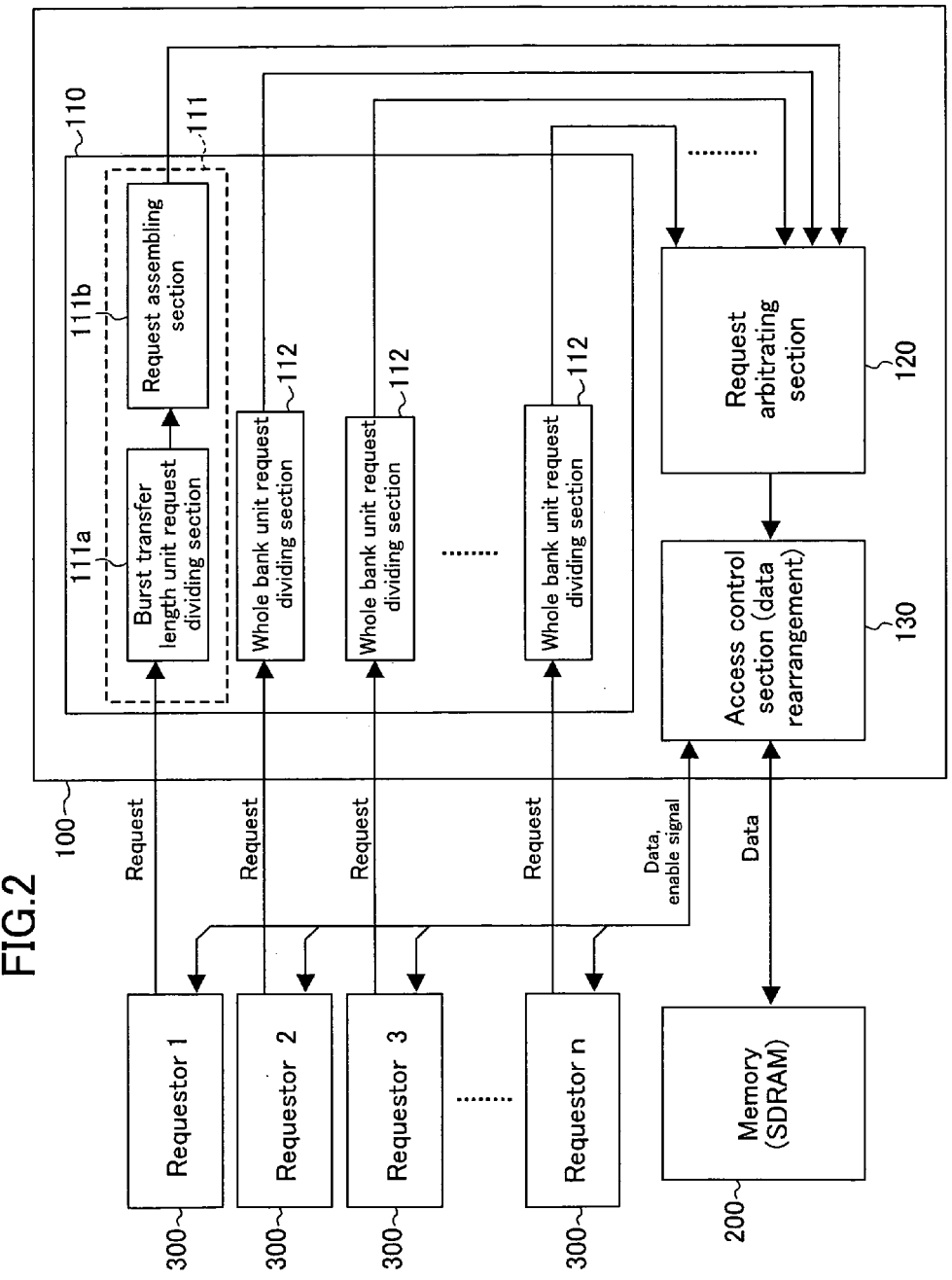
FIG. 2 is a block diagram illustrating a structure of the memory access control circuit of Embodiment 1 of the present invention.

Referring to FIG. 2, the memory access control circuit 100 comprises a request dividing section 110, a request arbitrating section 120, and an access control section 130.

The request dividing section 110 comprises a request dividing block 111 and a plurality of whole bank unit request dividing sections 112. The requesters 300 are connected to the request dividing block 111 and the whole bank unit request dividing sections 112 in one-to-one correspondence.

The request dividing block 111 comprises a burst transfer length unit request dividing section 111a and a request assembling section 111b.

The burst transfer length unit request dividing section 111a divides an access request of the connected requestor 300 with respect to the memory 200 into new access requests having a burst transfer length unit. For example, when the burst transfer length is 4 words and an access request from the requestor 300 is a request for 80-word transfer, 20 access requests are newly generated. Note that the access request of the requestor 300 is divided in a manner such that data to be transferred at a time is limited within a single memory bank, i.e., each access request thus generated does not extend over a plurality of banks.

The request assembling section 111b rearranges a plurality of access requests divided by the burst transfer length unit request dividing section 111a, and combines the access requests, one for each memory bank, into a single access request, so that a plurality of new access requests are generated. This combination is performed so that burst access is performed with respect to all the memory banks (the banks A to D) from a predetermined memory bank in accordance with the assembled access request.

Also, when there is a lack of access requests with respect to any one or more of the memory banks during the combination process of access requests, the request assembling section 111b generates necessary access requests to be combined.

According to the burst transfer length unit request dividing section 111a and the request assembling section 111b thus constructed, an access request output from the request assembling section 111b has a unit of 16 words when the burst transfer length is 4 words and the number of banks is 4.

Figure 3A:
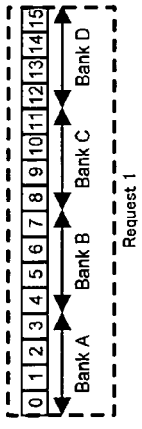
FIG. 3A is a diagram illustrating an execution example of division of an access request by a request dividing section where a read start position is 0 and a transfer size is 16 words.

Note that it may be determined, depending on a method of storing data, which memory bank an access request is assembled so that access is started from. For example, when 16 words of continuous data corresponding to one line of an image is stored in the memory 200 in units of 4 words in order of the bank A, B, C, and D as illustrated in FIG. 3A, the data is rearranged so that the data is accessed from the bank A.

The whole bank unit request dividing section 112 divides an access request of the requestor 300 connected thereto with respect to the memory 200 into a data transfer size when burst access is performed with respect to all the memory banks. A start bank for each divided access request is not particularly limited as long as the memory banks are transferred one by one. The sequence of banks to be transferred is fixed for all access operations.

Figure 4:
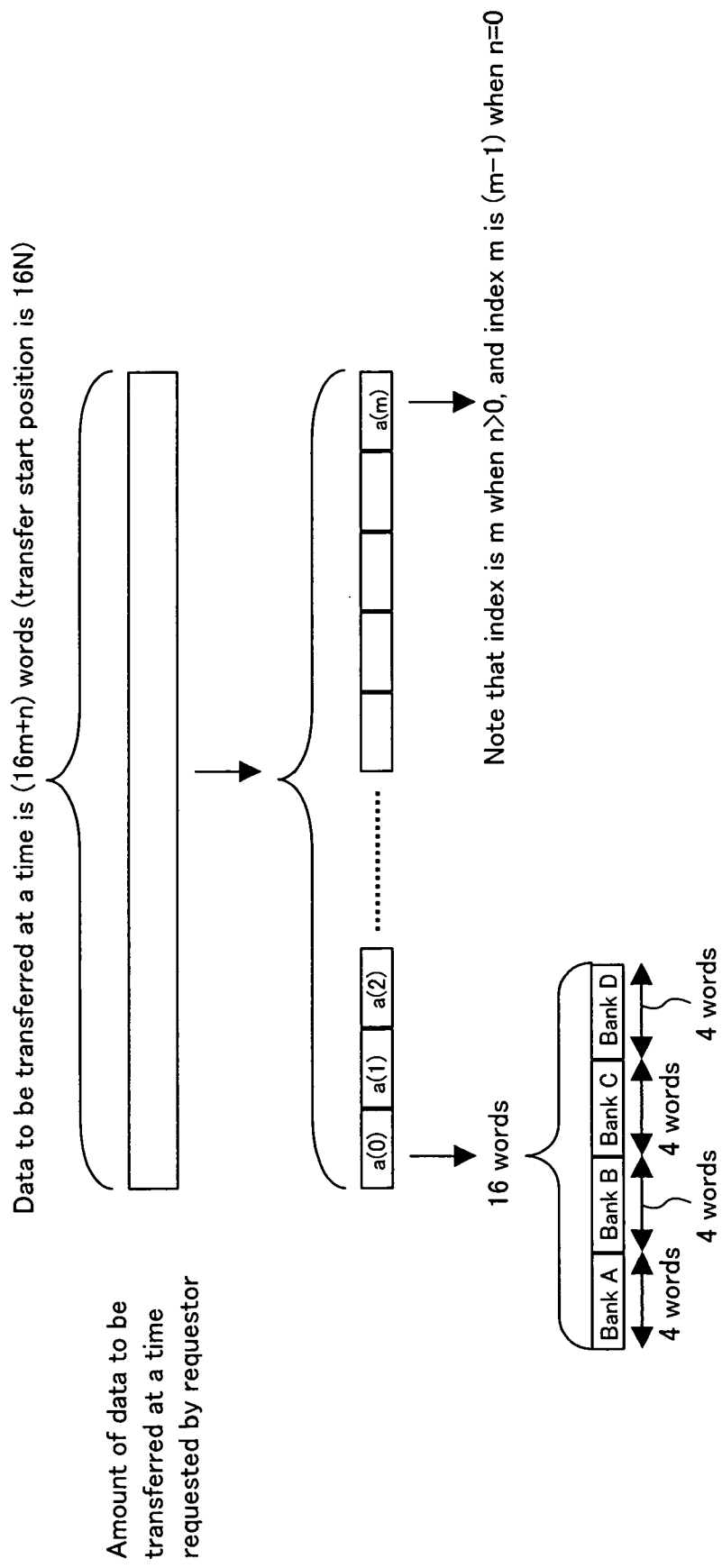
FIG. 4 is a diagram illustrating an execution example of division of an access request by a whole bank unit request dividing section 112.

For example, assuming that the burst transfer length is 4 words and the number of memory banks is 4, if the transfer start position of an access request received from each requestor 300 by the whole bank unit request dividing section 112 is 0 or 16N (N is 0 or a positive integer) and the data transfer size is (16m+n) words (m is 0 or a positive integer, and n is an integer of 0 or more and 15 or less), the whole bank unit request dividing section 112 divides the access request into access requests of 16 words (4 words×4=16), i.e., (m+1) new access requests each for transfer of 16-word data (when n is 0, m access requests), as illustrated in FIG. 4.

The request arbitrating section 120 rearranges a plurality of access requests (each is a 16-word transfer request) generated by the request assembling section 111b and the whole bank unit request dividing sections 112 in accordance with a predetermined arbitration method. The arbitration method of the request arbitrating section 120 is not particularly limited.

The access control section 130 controls data transfer between the requestor 300 issuing an access request and the memory 200, depending on the result of arbitration by the request arbitrating section 120. Specifically, an enable signal is output to the requestor 300 which transfers data, so that data transfer is performed between the requestor 300 and the memory 200. Data transfer is performed with respect to the memory 200 in the sequence of the access requests generated in the request assembling section 111*b* or the whole bank unit request dividing section 112. Data transfer may not be performed with respect to each requestor 300 with such a sequence. The rearrangement for SDRAM access may be performed by the access control section or may be controlled using a transfer address with respect to a requestor.

(Operation of the Memory Access Control Circuit 100)

An operation of the memory access control circuit 100 thus constructed will be described, illustrating an example that 16-word continuous data corresponding to one line of an image is stored in the memory 200 in units of 4 words in order of the banks A, B, C, and D.

Assuming that a read start position is a head of the continuous data, and the size of data to be transferred is, for example, 16 words, one request (a request 1 indicated in FIG. 3A) is generated, and 16-word data is transferred for a single access request, both when the data is accessed from the requester 300 connected to the whole bank unit request dividing section 112 and when the data is accessed from the requestor 300 connected to the request dividing block 111.

Figure 3B:
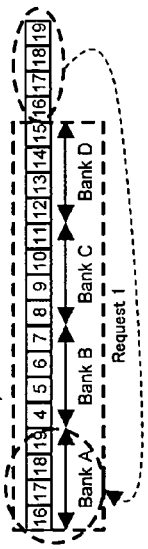
FIG. 3B is a an execution example of division of an access request by the request dividing section where a read start position is 4 and a transfer size is 16 words.
Figure 3C:
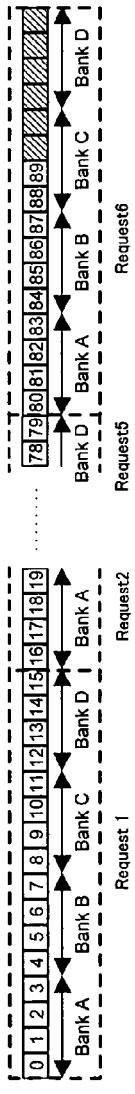
FIG. 3C is a an execution example of division of an access request by the request dividing section where a read start position is 0 and a transfer size is 90 words.

Similarly, as illustrated in FIG. 3C, even when the data transfer size is 90 words, any of the request assembling section 111*b* and the whole bank unit request dividing sections 112 generates six requests (requests 1 to 6 in FIG. 3C), so that 90-word data is transferred for the six access requests.

Next, an operation when a read start position is located at some midpoint of the continuous data will be described.

For example, when the requestor 300 connected to the request dividing block 111 performs an access request in which the data read start position is 4-th word (corresponding to the bank B) and the data transfer size is 16 words, the request assembling section 111*b* rearranges the access request into an access request (request 1) such that, as illustrated in FIG. 3B, access to the bank A storing data from a word 16 (17-th data from the data start position; hereinafter, (n+1)-th word from the data start position is referred to as a word n) to a word 19 is performed before access to the bank B (words 4 to 7 are stored).

Figure 3D:
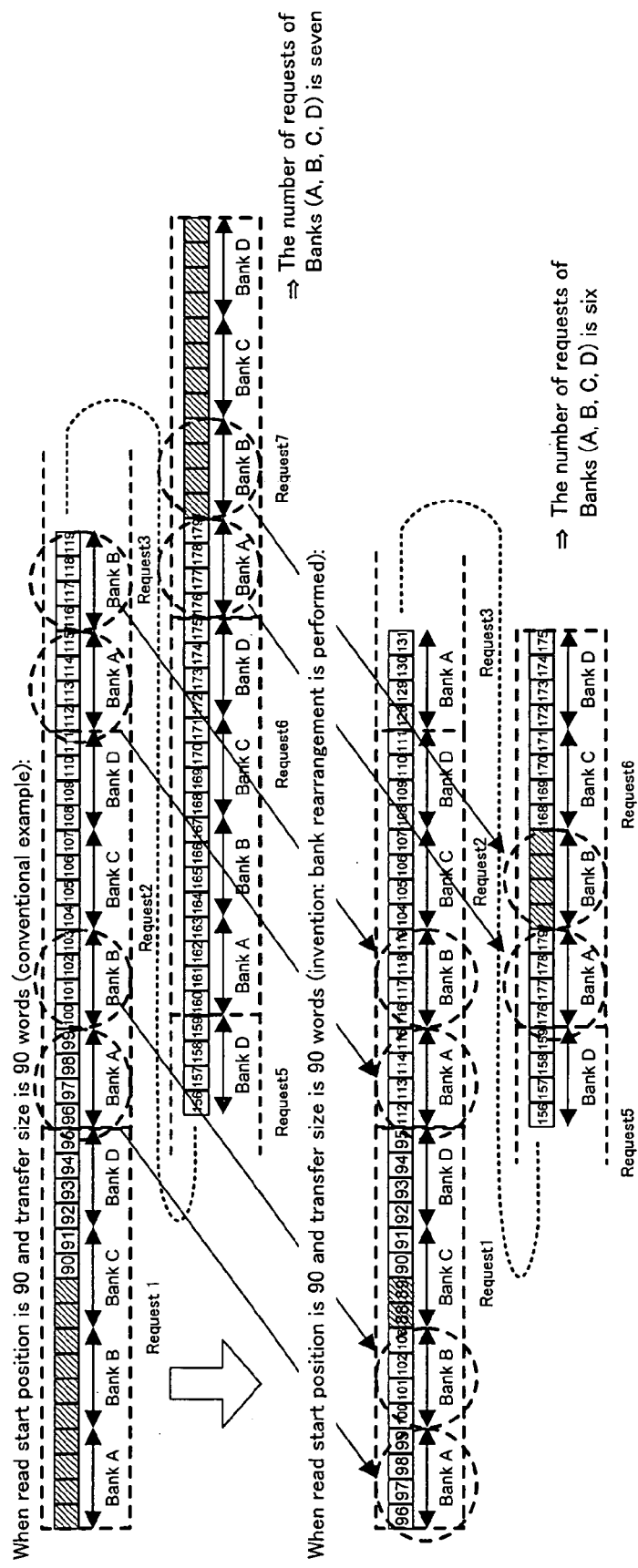
FIG. 3D is a diagram illustrating comparison between the number of times of transfer in a conventional memory access circuit and the number of times of transfer in the memory access circuit of the present invention, where a read start position is 90 and a transfer size is 90 words.

For example, when the requestor 300 connected to the request dividing block 111 performs an access request in which the read start position is a word 90 (starting from some midpoint of the bank C) and the data transfer size is 90 words, the burst transfer length unit request dividing section 111*a* and the request assembling section 111*b* divide the access request and rearranges the resultant divided access requests as illustrated in "example of invention" of FIG. 3D to generate 6 requests (requests 1 to 6). Note that, in this example, words 88 and 89 of the bank C for the request 1 and words 180 to 183 of the bank B for the request 6 are data which do not need to be transferred. However, in order to secure the continuity of the transfer operation, these access requests are generated, but the read data is discarded.

On the other hand, after the requestor 300 connected to the whole bank unit request dividing section 112 performs an access request in which the read start position is the word 90 and the data transfer size is 90 words, the whole bank unit request dividing section 112 divides the access request to seven access requests (requests 1 to 7) as illustrated in "conventional example" of FIG. 3D.

As described above, the number of access requests newly generated by the request assembling section 111*b* is smaller by one than the number of access requests generated by the whole bank unit request dividing section 112.

In the examples of data transfer of FIGS. 3C and 3D, when it is assumed that the size of one word is 4 bytes, a length of 90 words is 360 bytes and two requests correspond to 720 bytes. Therefore, the examples are effective when used in a system which performs video line transfer.

As described above, according to Embodiment 1, a plurality of data processing devices can efficiently access continuous data stored in a plurality of memory banks.

In order to avoid each access request from extending over a plurality of banks, an access request with respect to a memory is divided, and divided access requests are rearranged so that a memory is accessed in sequence from a predetermined memory bank, thereby avoiding occurrence of an invalid period (a period in which data is not output).

Variation of Embodiment 1 of the Present Invention

Figure 5:
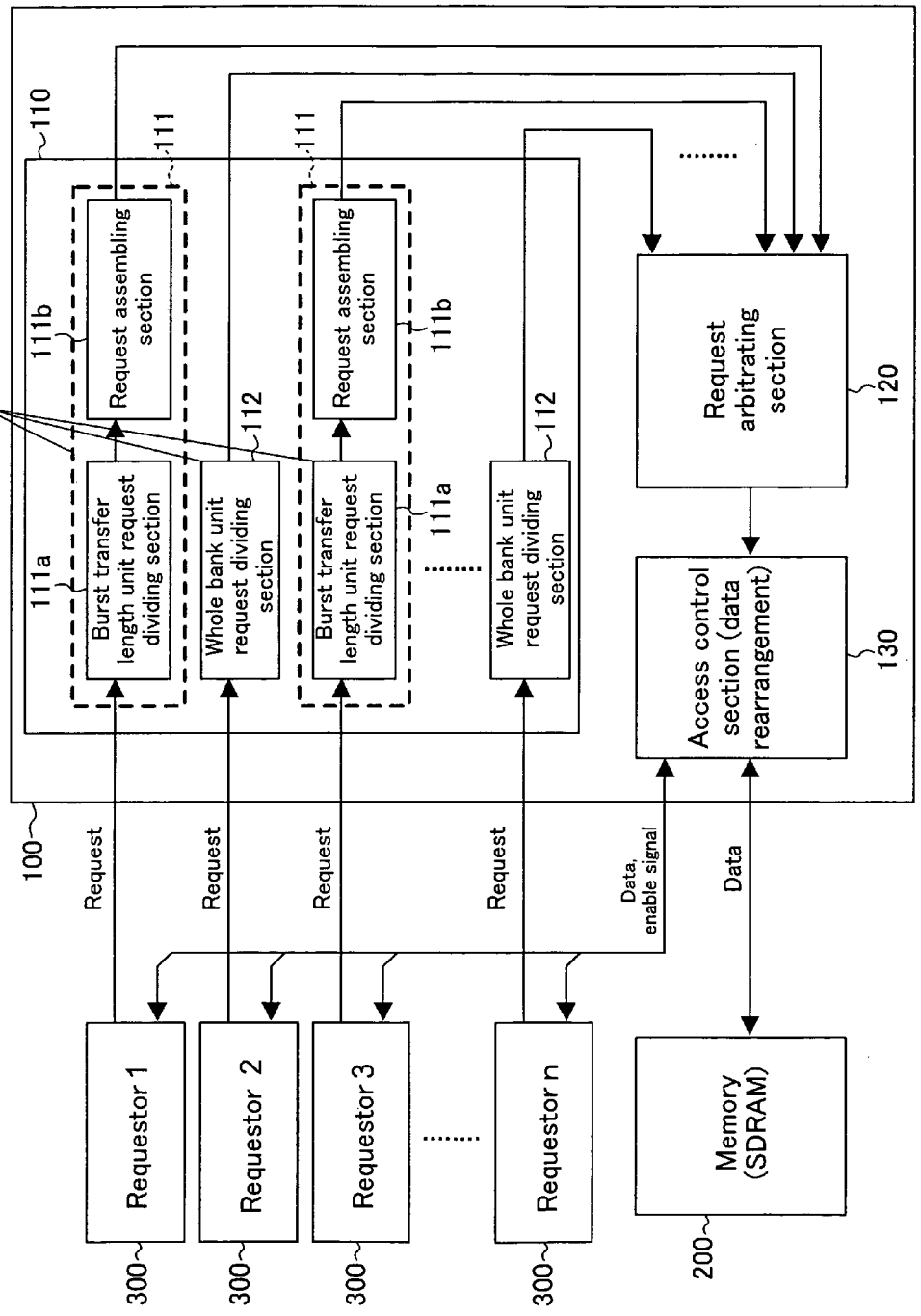
FIG. 5 is a block diagram illustrating a structure of a variation of the memory access control circuit of Embodiment 1 of the present invention.

Although the request dividing block 111 is provided only for one requestor 300 in Embodiment 1, the memory access control circuit 100 may be constructed in which the request dividing block 111 is provided for each of a plurality of the requesters 300 as illustrated in FIG. 5, for example.

Note that, in the following embodiment and variations, parts having functions similar to those of Embodiment 1 and the like are indicated with the same reference numerals and will not be explained.

It may be determined whether the requester 300 is connected to the request dividing section 110 or the whole bank unit request dividing section 112, depending on a characteristic of a request.

Other Variations of Embodiment 1 of the Present Invention

In the device of Embodiment 1, a plurality of access requests may be collectively processed (data transfer), depending on information about the number of times of transfer, which is input from the requestor 300.

Figure 6:
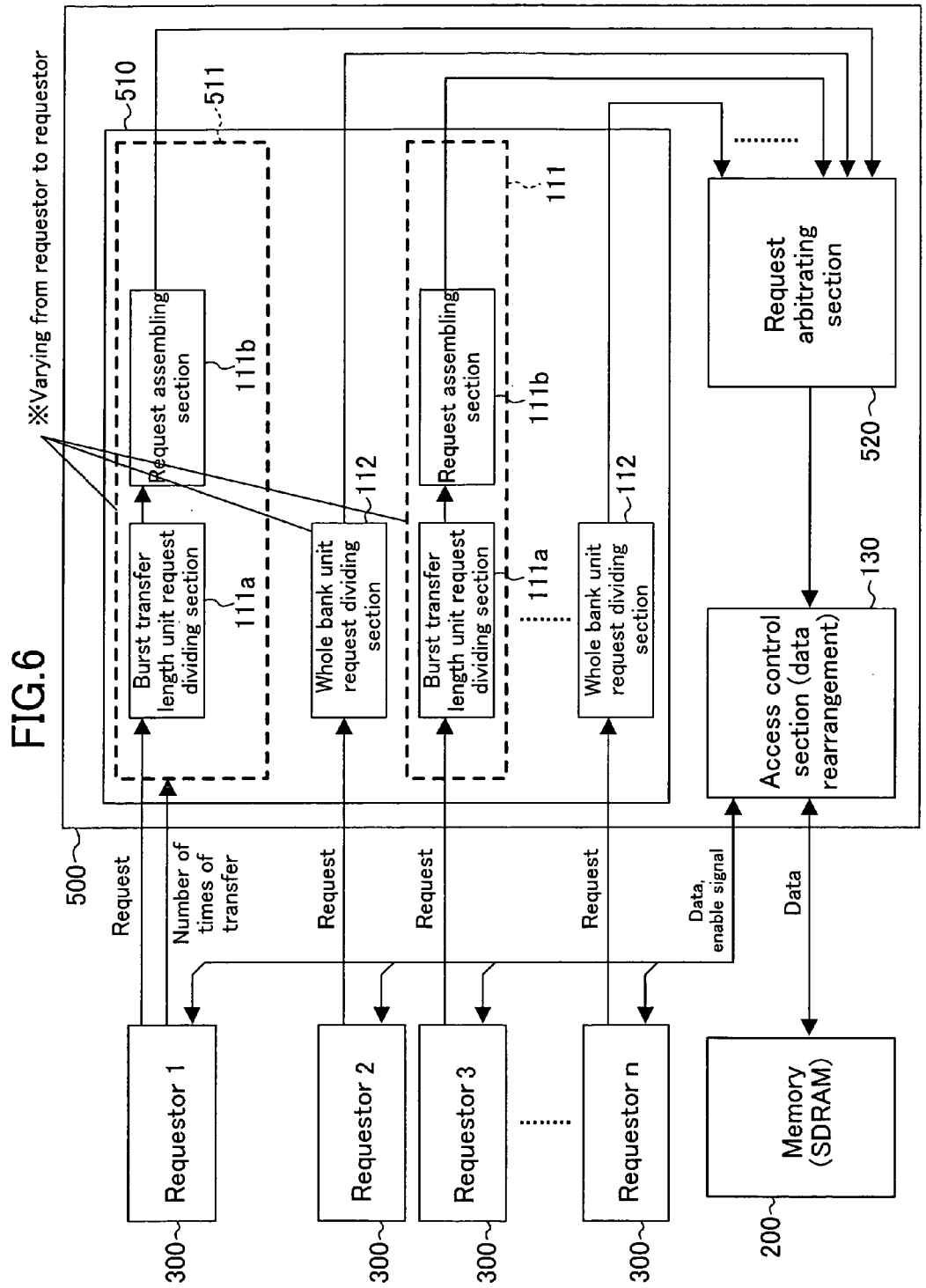
FIG. 6 is a block diagram illustrating a structure of another variation of the memory access control circuit of Embodiment 1 of the present invention.

Referring to FIG. 6, a memory access control circuit 500 according to a variation of Embodiment 1 of the present invention is different from the memory access control circuit 100 in that the memory access control circuit 500 comprises a request dividing section 510 in place of the request dividing section 110, and a request arbitrating section 520 in place of the request arbitrating section 120.

The request dividing section 510 is different from the request dividing section 110 in that a request dividing block 511 is added to the request dividing section 110.

The request dividing block 511 comprises a burst transfer length unit request dividing section 111*a* and a request assembling section 111*b*, and outputs the number-of-times-of-transfer information input from the requester 300 to the request arbitrating section 120.

The request arbitrating section 520 arbitrates the order of execution so that access requests output from the request dividing block 111 are collectively processed by the access control section 130 in units of a number corresponding to the number-of-times-of-transfer information.

Figure 7:
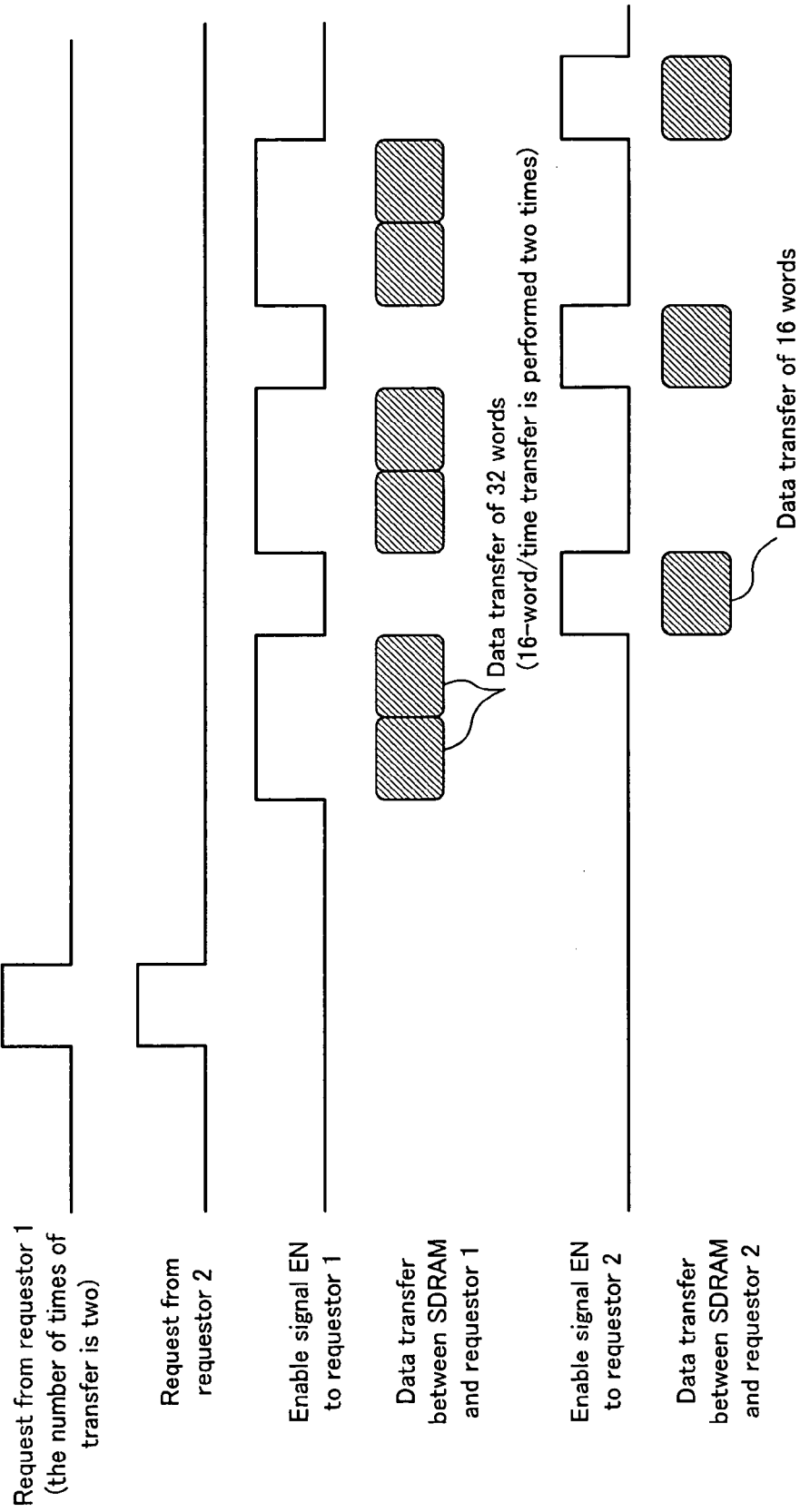
FIG. 7 is a data transfer timing chart between requestors and an SDRAM in another variation of the memory access control circuit of Embodiment 1 of the present invention.

In the memory access control circuit thus constructed, for example, when the number-of-times-of-transfer information is input from the requestor 300 such that two times of access are collectively processed, the burst transfer length unit request dividing section 111*a* and the request assembling section 111*b* divide an access request from the requestor 300, and outputs the number-of-times-of-transfer information to the request arbitrating section 120. The request arbitrating section 120 arbitrates the order of process so that access requests output from the dividing block 111 are collectively processed in units of two requests by the access control section 130. The access control section 130 issues an enable signal EN to the requester 300 with timing corresponding to the order of execution of these requests the requester 300, so that data transfer (32 words) is performed between the requestor 300 and the memory 200 in units of two requests as illustrated in FIG. 7.

Note that, when a data transfer request is issued from the requestor 300 connected to the whole bank unit request dividing section 112, 16-word data is transferred.

According to the above-described variation, the size of data to be transferred at a time can be controlled. Therefore, for example, the size of data to be transferred at a time can be increased with respect to a requester requiring a large amount of data, thereby making it possible to improve processing speed and data transfer efficiency.

Embodiment 2 of the Present Invention

An exemplary memory access control circuit which changes the access request dividing methods, depending on a status of arbitration of a request arbitrating section (the number of access requests waiting for data transfer) will be described.

Figure 8:
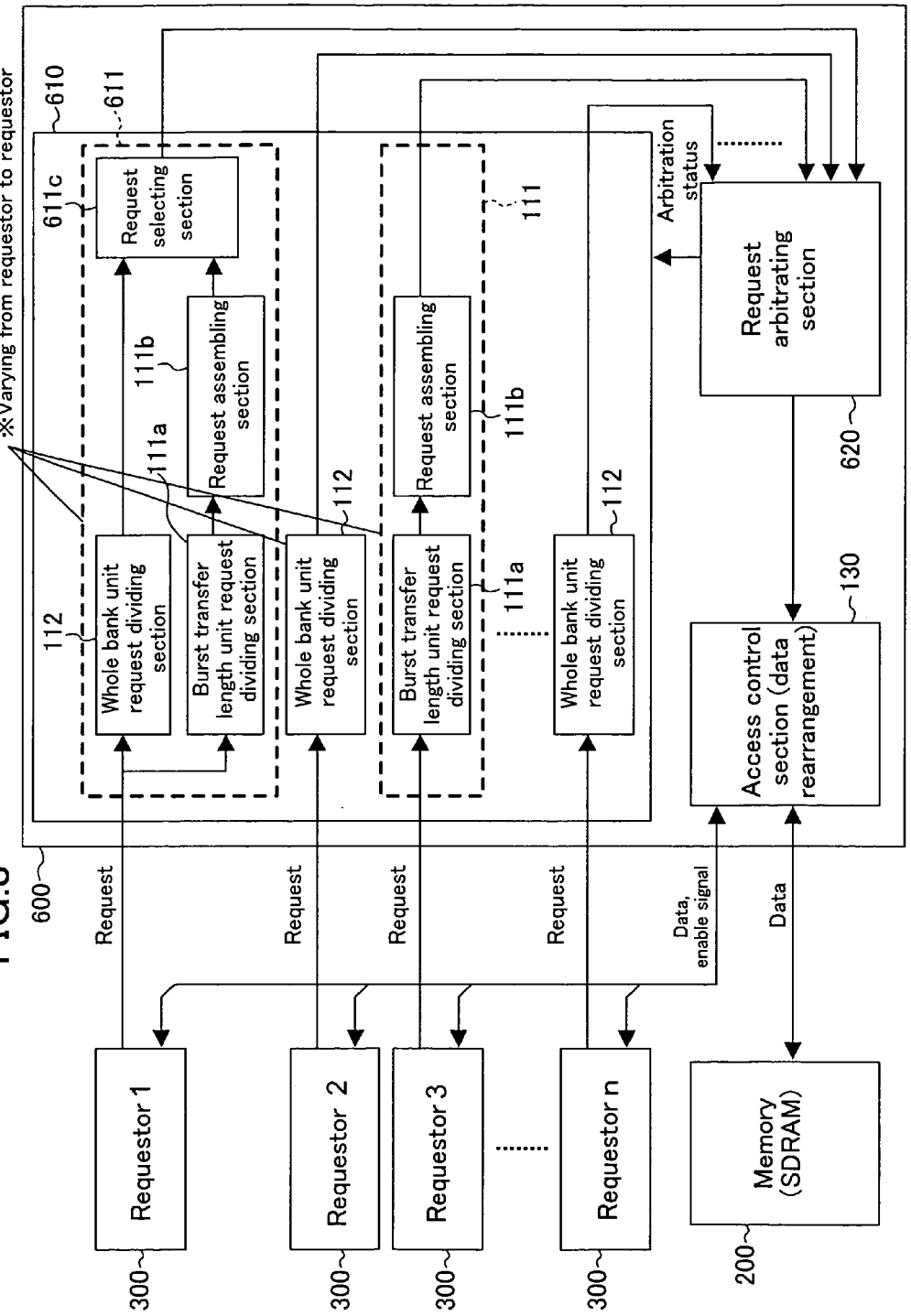
FIG. 8 is a block diagram illustrating a structure of a memory access control circuit according to Embodiment 2 of the present invention.

Referring to FIG. 8, a memory access control circuit 600 according to Embodiment 2 of the present invention comprises a request dividing section 610 in place of the request dividing section 110 of Embodiment 1 and a request arbitrating section 620 in place of the request arbitrating section 120.

The request dividing section 610 comprises a request dividing block 111, a request dividing block 611, and a plurality of whole bank unit request dividing sections 112.

The request dividing block 611 comprises a burst transfer length unit request dividing section 111a, a request assembling section 111b, a whole bank unit request dividing section 112, and a request selecting section 611c. The request selecting section 611c switches output of access requests generated in the whole bank unit request dividing section 112 and output of access requests generated in the request dividing block 111, depending on the status of arbitration (the number of access requests waiting for data transfer) by the request arbitrating section 120. Specifically, when the number of access requests waiting for data transfer is smaller than a predetermined number (space remains in the request arbitrating section), access requests generated by the whole bank unit request dividing section 112 are output. When the number of access requests waiting for data transfer is larger than a predetermined number (full of the request arbitrating section), access requests generated by the request dividing block 111 are output.

In addition to the arbitration function of the request arbitrating section 120, the request arbitrating section 620 outputs the arbitration status (the number of access requests waiting for data transfer) to the request dividing section 610.

With the above-described structure, for example, when access requests generated by the whole bank unit request dividing section 112 are output, the number of requests may increase. However, since a time required for the assembly in the request assembling section 111b can be eliminated as described in Embodiment 1, data transfer in which a transfer rate is paramount can be achieved if there is space in the request arbitrating section.

On the other hand, when the request arbitrating section is full, access requests generated by the request dividing block 111 are output, thereby reducing a waste request and avoiding an invalid period (a period during which data is not output). Therefore, transfer efficiency can be improved.

As described above, according to Embodiment 2, the access request dividing methods can be changed, depending on the request arbitration status, thereby making it possible to improve the processing rate and the data transfer efficiency.

Variation of Embodiment 2 of the Present Invention

Figure 9:
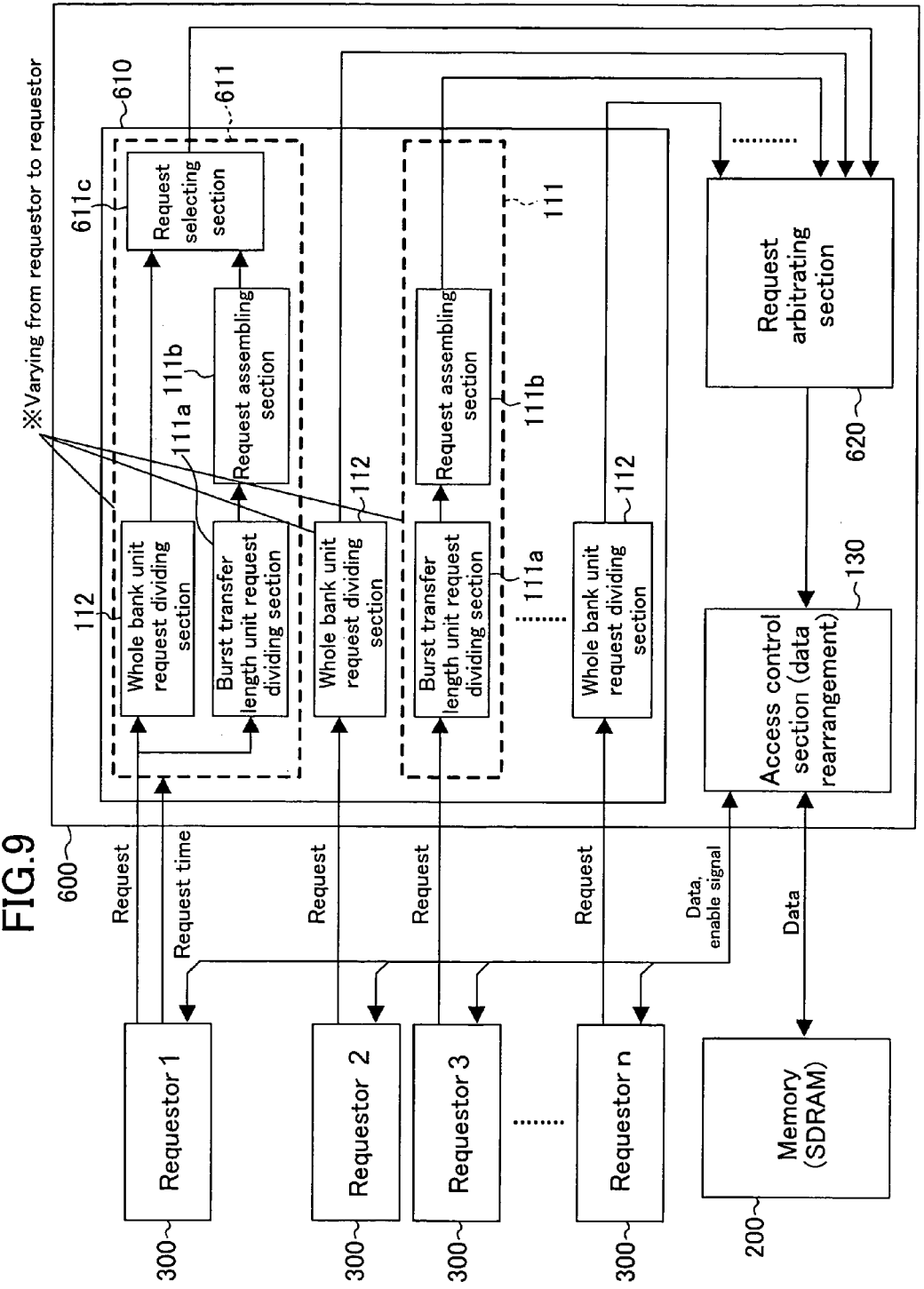
FIG. 9 is a block diagram illustrating a structure of a variation of the memory access control circuit of Embodiment 2 of the present invention.

The access request dividing methods may be changed, depending on a transfer request time (a time at which data transfer should be started after a data processing device outputs a data transfer request) which is indicated by a transfer request time signal provided from the requestor 300, instead of depending on the request arbitration status. Specifically, as illustrated in FIG. 9, the transfer request time signal output from the requestor 300 is input to the request dividing block 611.

Further, the request selecting section 611c is constructed so that, when the transfer request time indicated by the transfer request time signal input from the requestor 300 is shorter than or equal to a predetermined time, an access request generated by the whole bank unit request dividing section 112 is output, and when the transfer request time is longer than the predetermined time, an access request assembled by the request assembling section 111b is output.

Thereby, it is possible to select an access request dividing method, depending on a transfer request time, thereby improving the processing rate and the data transfer efficiency.

Another Variation of Embodiment 2 of the Present Invention

Figure 10:
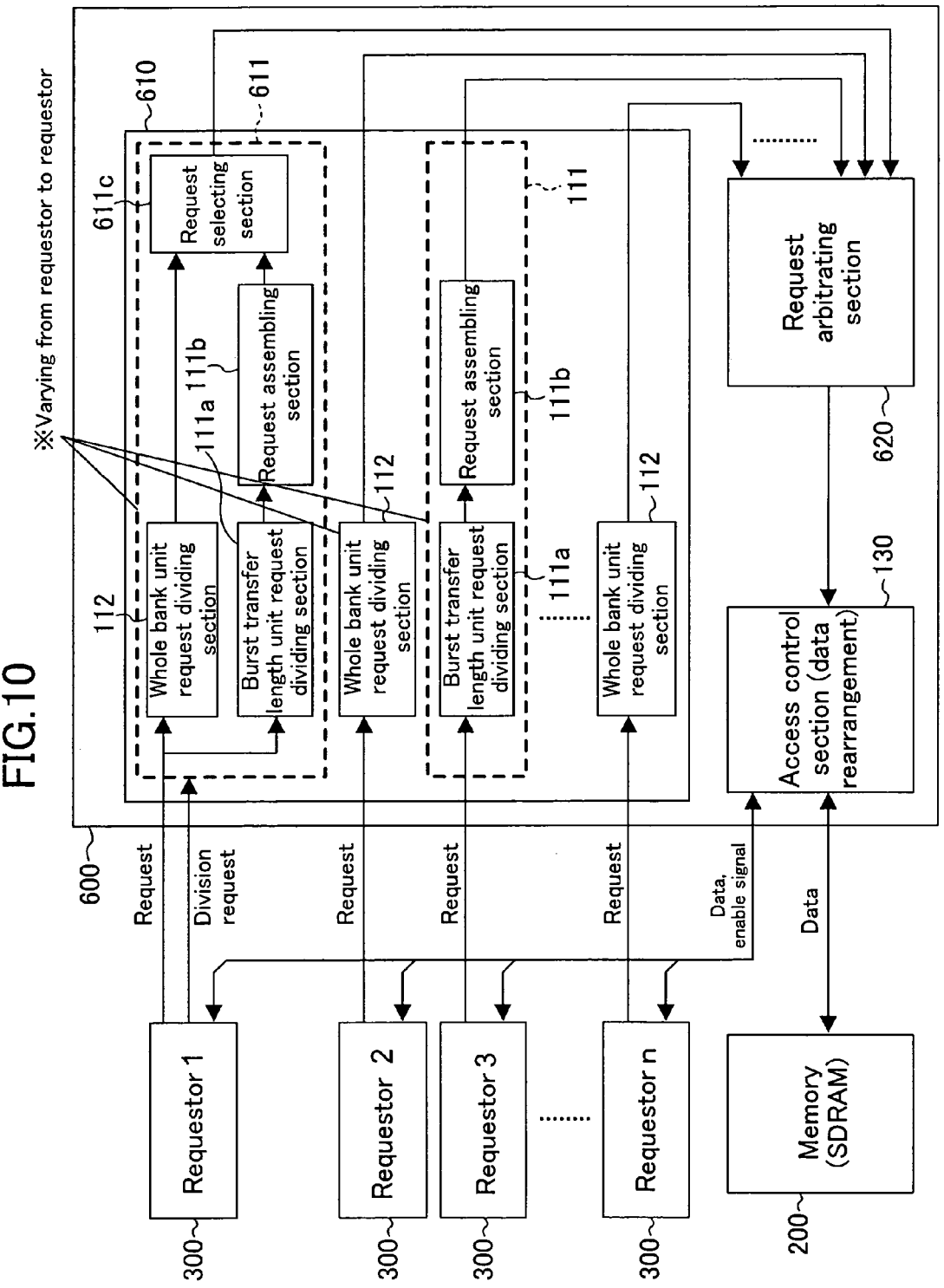
FIG. 10 is a block diagram illustrating a structure of another variation of the memory access control circuit of Embodiment 2 of the present invention.
Figure 11:
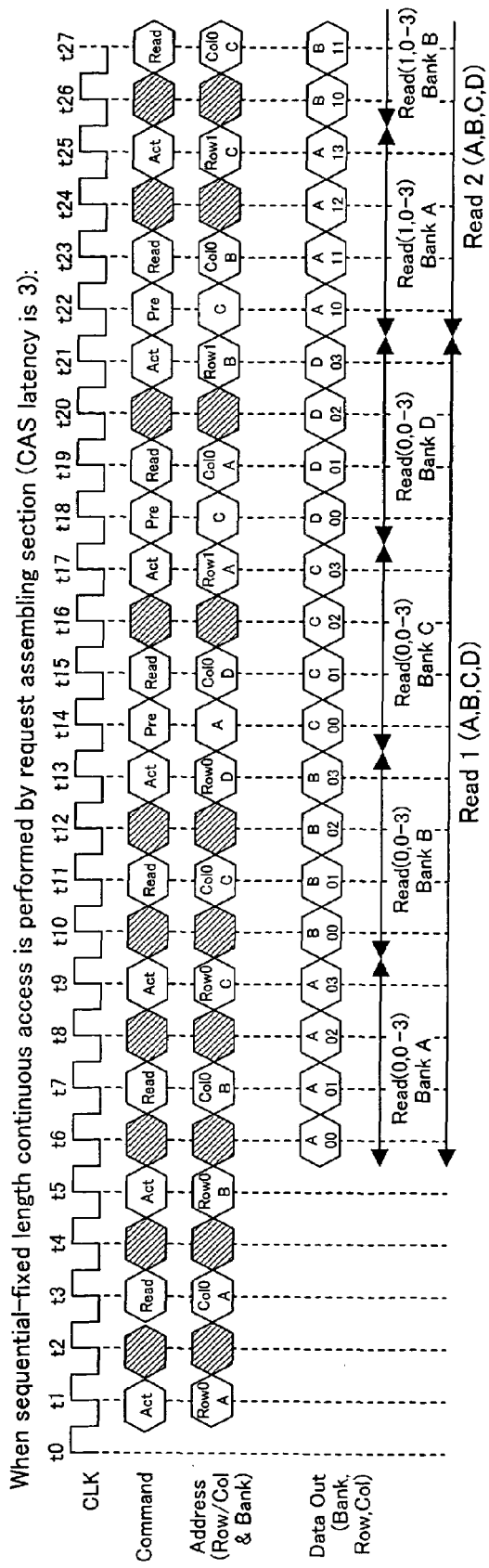
FIG. 11 is a timing chart when banks of an SDRAM are continuously accessed.
Figure 12:
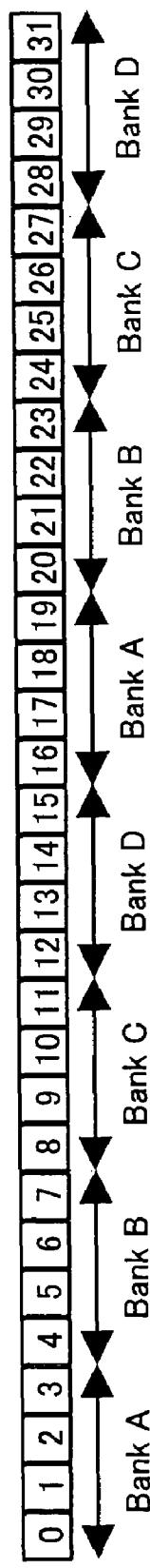
FIG. 12 illustrates the bank structure of an SDRAM used to store continuous data.
Figure 14:
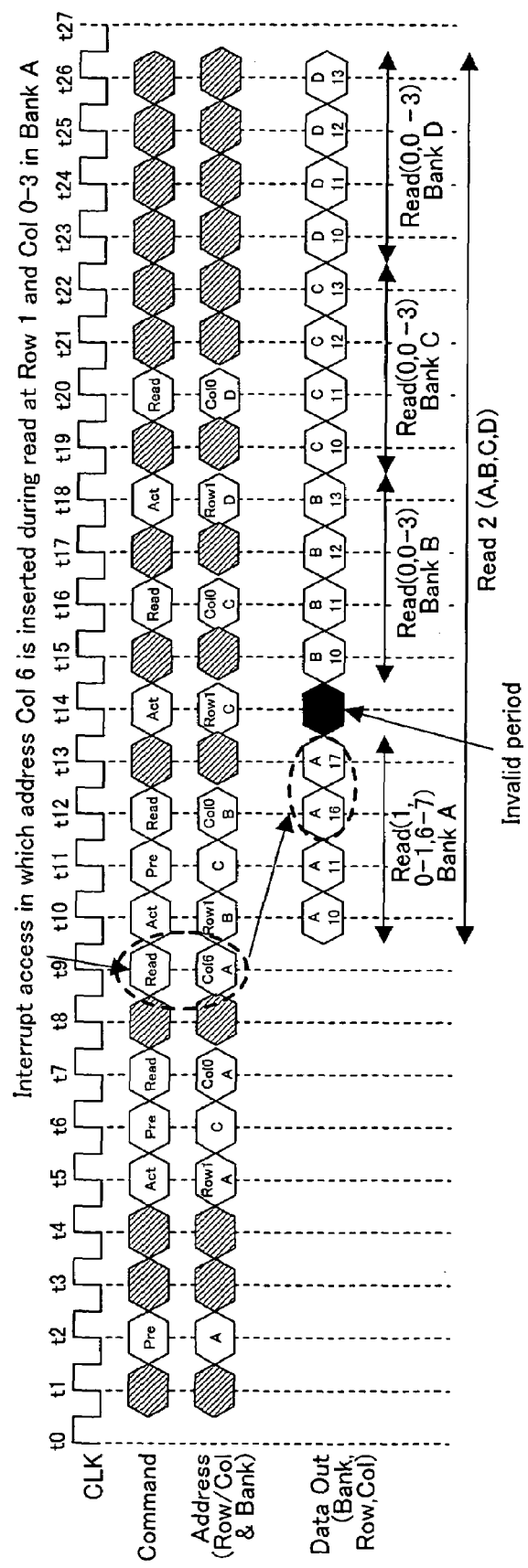
FIG. 14 is a timing chart when column addresses are changed at some point during burst access in a conventional memory access control circuit.

The access request dividing methods may be changed, depending on a divided request signal output from the requestor 300. Specifically, as illustrated in FIG. 10, the request selecting section 611c may be constructed so that one of an access request generated by the whole bank unit request dividing section 112 and an access request generated by the request dividing block 111 is selectively output, depending on the divided request signal input from the requestor 300.

Thereby, the access request dividing method can be controlled by a software control. For example, if the dividing method is controlled, depending on the read start position or type of data to be transferred, it is possible to improve the processing rate and the data transfer efficiency.

Note that the unit of data word length described in the above-described embodiments is not limited to a particular word length, and may be, for example, a byte (8 bits), a long word (32 bits), or the like.

The synchronous memory is not limited to SDRAM, and may be, for example, a clock synchronous memory, such as a synchronous SRAM or the like.

The number of the request dividing blocks 111 and the number of the whole bank unit request dividing sections 112 described above are only for illustrative purposes, and may be set as required, depending on the number of data processing devices or the like.

Although data to be transferred is image data in the above-described embodiments, the continuous data is not limited to this, and may be, for example, audio data or the like.

As described above, the memory access control circuit of the present invention has the effect that a data processing device can efficiently access continuous data stored in a plurality of memory banks, and is useful as a memory access control circuit of controlling an access operation of a data processing device with respect to a synchronous memory.

What is claimed is:

1. A memory access control circuit of controlling access of a data processing device to a memory, wherein the memory is a synchronous memory having a plurality of memory banks capable of being operated independently, and data can be burst-transferred in accordance with a clock signal, the memory access control circuit comprising:
    a burst transfer length unit transfer request dividing section of receiving a data transfer request with respect to the memory from the data processing device, and dividing the received data transfer request into a plurality of data transfer requests in which a data transfer amount is an amount of data to be burst-transferred at a time, and the data to be burst-transferred at a time is within a single memory bank;
    a transfer request assembling section of assembling the plurality of data transfer requests divided by the burst transfer length unit transfer request dividing section into a plurality of new data transfer requests obtained by combining the divided data transfer requests, one for each memory bank, so that access is always performed from a fixed memory bank; and
    a data transfer control section of controlling data transfer between the memory and the data processing device based on one of the new data transfer requests assembled in the transfer request assembling section.

2. The memory access control circuit of claim 1, wherein when there is a lack of data transfer requests with respect to any of the memory banks during the combination of data transfer requests, the transfer request assembling section generates necessary data transfer requests to be combined.

3. The memory access control circuit of claim 1, wherein at least two burst transfer length unit transfer request dividing sections and at least two transfer request assembling sections are provided,
    the memory access control circuit further comprises an execution order determining section of determining an order of execution of data transfer requests generated by each of the transfer request assembling sections, and
    the data transfer control section controls data transfer in accordance with the order determined by the execution order determining section.

4. The memory access control circuit of claim 1, further comprising:
    a whole memory bank unit transfer request dividing section of receiving a data transfer request with respect to the memory from a data processing device different from a data processing device whose data transfer request is received by the burst transfer length unit transfer request dividing section, and dividing the received data transfer request into a plurality of new data transfer requests in which a data transfer amount is a product of an amount of data to be burst-transferred at a time multiplied by the number of memory banks in the memory; and
    an execution order determining section of determining an order of execution of the data transfer request generated by the transfer request assembling section and the data transfer request generated by the whole memory bank unit transfer request dividing section,
    wherein the data transfer control section controls data transfer with the order determined by the execution order determining section.

5. The memory access control circuit of claim 3, wherein the execution order determining section determines the order of execution such that the data transfer request of the data processing device is continuously executed the number of times indicated by number-of-times information provided by the data processing device.

6. The memory access control circuit of claim 4, wherein the execution order determining section determines the order of execution such that the data transfer request of the data processing device is continuously executed the number of times indicated by number-of-times information provided by the data processing device.

7. The memory access control circuit of claim 3, further comprising:
    a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and
    a selecting section of receiving transfer status information indicating how many data transfer requests for which data transfer has not been ended remain, and outputting the data transfer request generated by the whole memory bank unit transfer request dividing section to the execution order determining section when the number of data transfer requests waiting for data transfer indicated by the transfer status information is smaller than a predetermined number, and outputting the data transfer request generating by the transfer request assembling section to the execution order determining section when the number of data transfer requests waiting for data transfer is larger than the predetermined number,
    wherein the execution order determining section determines the order of execution of the received data transfer request, and outputs the transfer status information.

8. The memory access control circuit of claim 4, further comprising:
    a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and
    a selecting section of receiving transfer status information indicating how many data transfer requests for which data transfer has not been ended remain, and outputting the data transfer request generated by the whole memory bank unit transfer request dividing section to the execution order determining section when the number of data transfer requests waiting for data transfer indicated by the transfer status information is smaller than a predetermined number, and outputting the data transfer request generating by the transfer request assembling section to the execution order determining section when the number of data transfer requests waiting for data transfer is larger than the predetermined number,
    wherein the execution order determining section determines the order of execution of the received data transfer request, and outputs the transfer status information.

9. The memory access control circuit of claim 1, further comprising:

a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and a selecting section of receiving, from the data processing device, transfer request time information indicating within what transfer request time after the data processing device outputs a data transfer request data transfer should be started, and outputting the data transfer request generated by the whole memory bank unit transfer request dividing section to the execution order determining section when a transfer request time indicated by the transfer request time information is shorter than a predetermined time, and outputting the data transfer request generated by the transfer request assembling section to the execution order determining section when the transfer request time is longer than the predetermined time.

10. The memory access control circuit of claim 1, further comprising:

a whole memory bank unit transfer request dividing section of receiving the same data transfer request as that of the burst transfer length unit transfer request dividing section, and dividing the received data transfer request into a plurality of new data transfer requests in which a data transfer amount is a product of an amount of data to be burst-transfer at a time multiplied by the number of the memory banks; and a selecting section of selectively outputting one of the data transfer request generated by the whole memory bank unit transfer request dividing section and the data transfer request generated by the transfer request assembling section, based on selection information output by the data processing device.

* * * * *